(12) United States Patent
Nagumo et al.

(10) Patent No.: US 6,970,514 B1
(45) Date of Patent: Nov. 29, 2005

(54) SIGNAL PROCESSING DEVICE, SIGNAL PROCESSING METHOD, DECODING DEVICE, DECODING METHOD AND RECORDING MEDIUM

(75) Inventors: Takefumi Nagumo, Tokyo (JP); Yoichi Yagasaki, Tokyo (JP); Kuniaki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 484 days.

(21) Appl. No.: 09/699,209

(22) Filed: Oct. 27, 2000

(30) Foreign Application Priority Data

Oct. 29, 1999 (JP) ................................ P11-309864

(51) Int. Cl.⁷ .............................................. H04N 7/18
(52) U.S. Cl. .............................. 375/240.27; 375/240.26
(58) Field of Search ........................ 375/240.25–240.29

(56) References Cited

U.S. PATENT DOCUMENTS

| | | | | |
|---|---|---|---|---|
| 6,115,422 A * | 9/2000 | Anderson et al. | ........... | 375/240 |
| 6,285,689 B1 * | 9/2001 | Negishi et al. | ............. | 370/537 |
| 6,456,783 B1 * | 9/2002 | Ando et al. | .................. | 386/125 |
| 6,483,543 B1 * | 11/2002 | Zhang et al. | ............ | 348/390.1 |
| 6,504,576 B2 * | 1/2003 | Kato | ...................... | 375/240.27 |
| 6,584,273 B1 * | 6/2003 | Ashley et al. | ................. | 386/52 |

* cited by examiner

*Primary Examiner*—Andy Rao
(74) *Attorney, Agent, or Firm*—Frommer Lawrence & Haug LLP; William S. Frommer; Samuel S. Lee (57) ABSTRACT

A device and a method for multiplexing a plurality of bit streams, a device and a method for decoding a multiplexed signal and a recording medium storing a program for multiplexing a plurality of bit streams are adapted to carry out a dividing step for dividing said second bit stream into predetermined units, an adding step for adding a start code to each of said units obtained by dividing said second bit stream and a multiplexing step for defining a user operable region in said first bit stream and multiplexing and recording at least part of said second bit stream on said user operable region. As a result, a picture signal can be decoded with minimal processing steps because a conventional coding system can be used without modification.

28 Claims, 7 Drawing Sheets

FIRST BIT STREAM BS$_1$

FIG.2B

SECOND BIT STREAM BS$_2$

TIME →

→ MULTIPLEXED AS TRANSPORT STREAM, PROGRAM STREAM

FIRST BIT STREAM BS₁

| AU₁₀ | AU₁₁ | AU₁₂ | AU₁₃ | AU₁₄ | AU₁₅ | AU₁₆ | AU₁₇ |

FIG.4B

SECOND BIT STREAM BS₂

FIG.4C

SECOND BIT STREAM BS₂

SIGNAL PROCESSING DEVICE, SIGNAL PROCESSING METHOD, DECODING DEVICE, DECODING METHOD AND RECORDING MEDIUM

BACKGROUND OF THE INVENTION

1. Field of the Invention

This invention relates to a device and a method for multiplexing a plurality of bit streams and also to a device and a method for decoding a multiplexed signal. The present invention also relates to a recording medium storing a program for multiplexing a plurality of bit streams.

2. Description of the Related Art

In systems such as video conference systems and video phone systems adapted to transmitting moving picture signals to remote receivers, video signals are normally compressed and encoded by utilizing line correlations and interframe correlations of picture signals in order to efficiently utilize the transmission path.

The MPEG (Moving Picture Experts Group) system (for coding moving pictures for storage) is a typical highly efficient coding system for processing moving pictures. This system was adopted as standard system as a result of the discussions in the ISO-IEC/JTC1/SC29/WG11. As a matter of fact, it is a hybrid system obtained by combining motion compensation predictive coding and discrete cosine transformation (DCT) coding.

Figure 1:
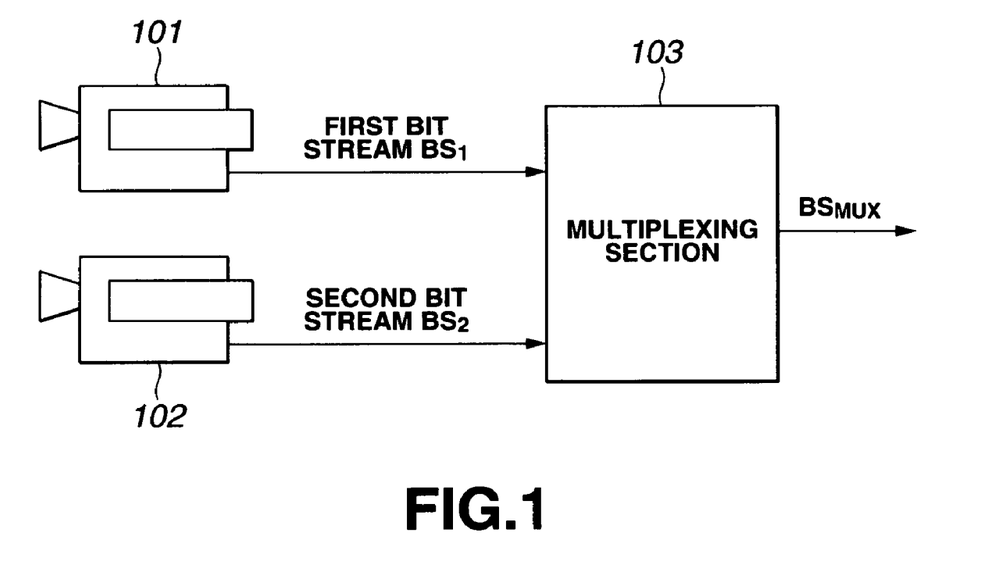
FIG. 1 is a schematic illustration of a plurality of bit stream input to a multiplexing section.
Figure 2A:
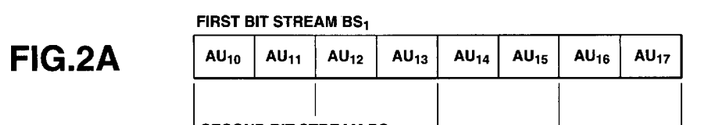
FIG. 2 is a schematic illustration of the conventional operation of multiplexing a plurality of bit streams.
Figure 2B:
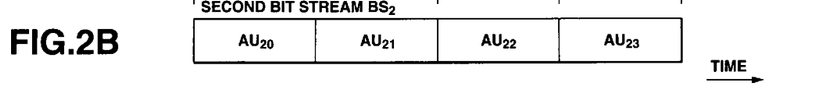
Figure 2C:
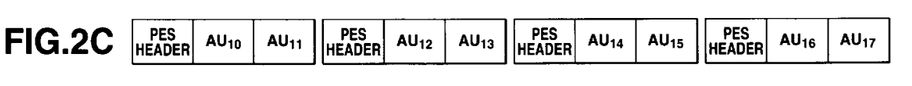
Figure 2D:
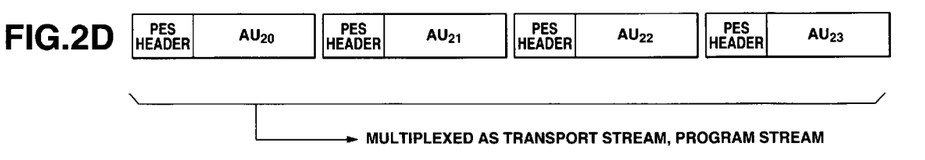

Assume now that a picture is taken by means of a first video camera 101 and a second video camera 102 as shown in FIG. 1 of the accompanying drawings and encoded by means of such a coding system.

Also assume that the first bit stream BS1 output from the first video camera and the second bit stream BS2 output from the second video camera are synchronized on a frame by frame basis for the two obtained pictures and multiplexed into a single bit stream BSMUX by multiplexing section 103.

Then, conventionally, the so-called MPEG 2 system (ISO/IEC19818-1) is used for the multiplexing. This multiplexing technique will now be described by referring to FIG. 2 of the accompanying drawings.

FIG. 2 schematically illustrates how two bit streams of encoded pictures are coded simultaneously on a frame by frame basis for the two obtained pictures so that they may be synchronized.

In FIG. 2, A schematically shows the first bit stream BS1 while B schematically shows the second bit stream BS2. Each box of the first and second bit streams BS1, BS2 represents the smallest unit for forming a bit stream that is referred to as access unit (AU). In the case of MPEG 2, an access unit corresponds to a single picture.

In the example of FIG. 2, the frame unit of the first bit stream BS1 and that of the second bit stream BS2 shows a dimensional ratio of 2:1. In other words, the time of two access units of the first bit stream BS1 corresponds to that of a single access unit of the second bit stream BS2.

In the case of MPEG 2, the input bit stream is divided into access units having an arbitrarily selected time. For the purpose of simplicity, assume here that the first bit stream is divided into access unit AU10, access unit AU11, access unit AU12, access unit AU13, . . .

Also assume that the bit stream BS2 is divided into similar access units or frames. More specifically, it is divided into access unit AU20, access unit AU21, access unit AU22, access unit AU23, . . .

Thereafter, as shown in C and D of FIG. 2, PES (packetized elementary stream) packets are formed by adding PES packet headers to the divided bit streams on the basis of a given time unit good for both of the bit streams.

A PTS (presentation time stamp) that is time control information is inserted into each PES packet header. The display time information of the leading access unit is written into the PTS. Any corresponding PES packets are made to have a same PTS.

In this way, PES packets are formed for the first and second bit streams BS1 and BS2 that are divided. Then, the first and second bit streams BS1 and BS2 are transformed into a single bit stream on the basis of their PES packets.

Thus, according to the MPEG 2 system, a program stream (PS) for forming a single program or a transport stream (TS) for forming a plurality of programs are generated by using PES packets.

In this way, it is possible to multiplexes a pair of bit streams to form a single bit stream, synchronizing them by using the MPEG system.

However, when multiplexing a pair of bit streams by using the MPEG 2 system, it is necessary to inversely multiplex a multiplexed bit stream BSMUX to rearrange the bit stream and decode the coded signal in order to restore the original bit streams from the multiplexed bit stream BSMUX.

In other words, when decoding the multiplexed bit stream BSMUX, there are needed a means for rearranging the inversely multiplexed bit stream and a means for decoding the rearranged bit stream.

Therefore, conventionally, the process of decoding a multiplexed bit stream BSMUX requires the use of complex devices and decoding steps.

BRIEF SUMMARY OF THE INVENTION

In view of the above identified circumstances, it is therefore the object of the present invention to provide a signal processing device and a signal processing method adapted to multiplexing a plurality of bit streams in a simple way and also to a recording medium storing a program to be used for such a multiplexing operation.

According to the invention, the above object is achieved by providing a signal processing device for multiplexing a plurality of bit streams comprising a multiplexing means for defining a user operable region in a bit stream, separating at least part of another other bit stream and putting the separated part into the user operable region for multiplexing.

In another aspect of the invention, there is provided a signal processing method for multiplexing a plurality of bit streams comprising a multiplexing step of defining a user operable region in a bit stream, separating at least part of another other bit stream and putting the separated part into the user operable region for multiplexing.

In still another aspect of the invention, there is provided a recording medium storing a program to be used for multiplexing a plurality of bit streams, said program being adapted to defining a user operable region in a bit stream, separating at least part of another other bit stream and putting the separated part into the user operable region for multiplexing.

The present invention makes it possible to multiplex a plurality of bit streams within the framework of the MPEG 2 Video Standards, establishing synchronism for the bit streams, without using the so-called MPEG 2 system.

The above multiplexing operation is conducted by the user, utilizing the user operable region that is a definable data region.

For the purpose of the present invention, a frame or a plurality of frames can be inserted into a user operable region. For instance, a group of pictures (GOP) of MPEG 2 can be inserted there. In the case of so-called MPEG 2, "user_data" corresponds to a user operable region.

When so-called MPEG 2 is used and a first bit stream and a second bit stream are multiplexed, the multiplexing operation is conducted by utilizing "user_data" of the first bit stream, synchronizing the first and second bit streams.

More specifically, the second bit stream is divided into frames including the video information such as the sequence header that is located at the leading end of the video bit stream. Then, the second bit stream that has been divided is processed by using "start_code" in order to prevent any erroneous operations and then "user_data_start_code" is added thereto before it is inserted into the position of "user_data" of the first bit stream.

At this time of this insertion, "user_data" of the first bit stream and the second bit stream that is inserted are made to have a same display time and/or a same decoding time. With this arrangement, it is now possible to synchronize the first and second bit streams without using the MPEG system.

Additionally, at this time, the fist bit stream now having "user_data" into which the second bit stream is inserted conforms to the MPEG 2 syntax so that it can be decoded by means of a decoder that satisfies the requirements of MPEG 2.

As described above, according to the invention, a plurality of bit streams are multiplexed by putting a bit stream into a user operable region of another bit stream.

Therefore, according to the invention, it is possible to multiplex a plurality of bit streams that are otherwise separated from each other and store and transmit it. Additionally, since the conventional coding system can be used without modifying it by using a user operable region that may be "user_data", it is also possible to restore the original picture with a minimal number of processing steps.

DETAILED DESCRIPTION OF THE INVENTION

Now, a device and a method for multiplexing a plurality of bit streams and a recording medium according to the invention will be described in greater detail by referring to the accompanying drawings that illustrate preferred embodiments thereof. Note that the use of so-called MPEG 2 is assumed in the following description unless indicated otherwise.

Figure 3:
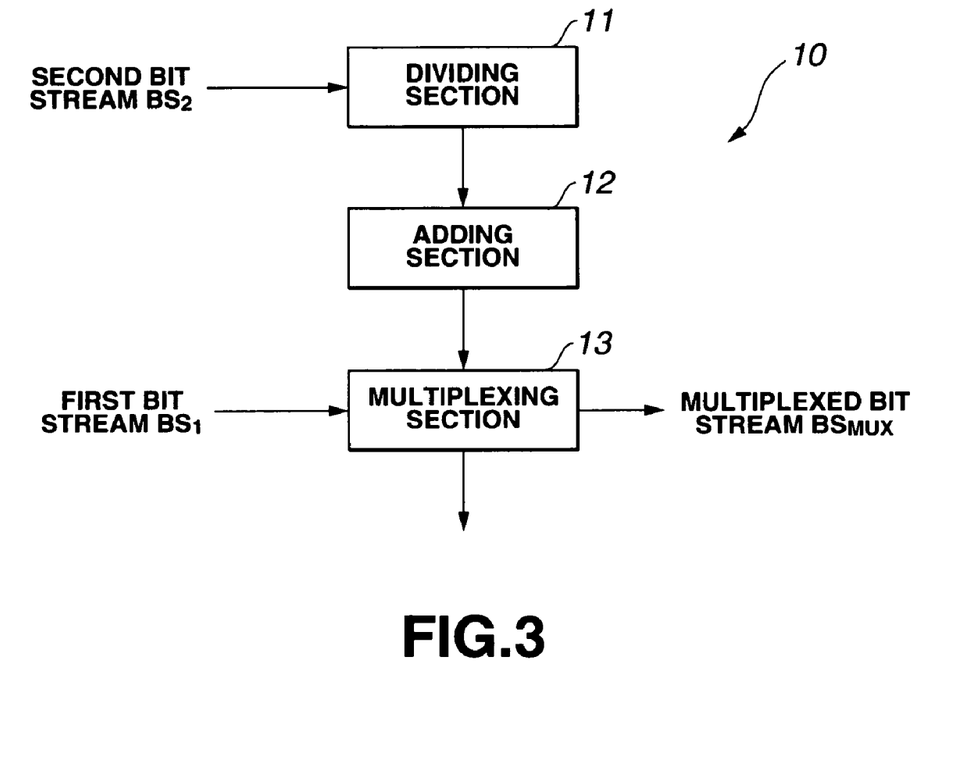
FIG. 3 is a block diagram of a signal processing device according to the invention, schematically illustrating its configuration.

Firstly, an embodiment of signal processing device will be described by referring to FIG. 3. This embodiment of signal processing device is adapted to dividing second bit stream BS2 and inserting it into a user operable region or "user_data" of first bit stream BS1 for multiplexing the first bit stream BS1 and the second bit stream BS2.

The signal processing device 10 comprises a dividing section 11 for dividing an externally input second bit stream BS2 into access units and an adding section 12 for adding "start_code" and a marker bit to each access unit output from the dividing section 11.

A first bit stream BS1 as shown in A of FIG. 4 and a second bit stream BS2 as shown in B of FIG. 4 are externally input to the signal processing device.

Figure 4A:
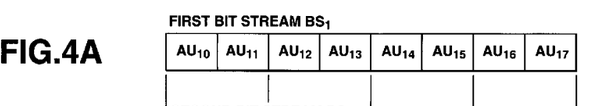
FIG. 4 is a schematic illustration of the operation of multiplexing a plurality of bit streams according to the invention.
Figure 4B:
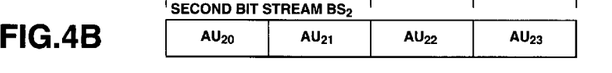

Assume that both the first bit stream BS1 and the second bit stream BS2 can be divided into units of frames or those of a plurality of frames.

More specifically, the first bit stream BS1 includes access unit AU10, access unit AU11, access unit AU12, . . .

Similarly, the second bit stream BS2 includes access unit AU20, access unit AU21, access unit AU22, . . .

Also assume that the access unit AU10 and the access unit AU20, the access unit AU12 and the access unit AU21, the access unit access unit 14 and the access unit AU22, the access unit AU16 and the access unit AU23 have a same display time and/or a same decoding time.

The second bit stream BS2 is input to the dividing section 11. Then, the dividing section 11 divides the second bit stream BS2 into access units and outputs the obtained access units. A unit comprising two or more than two access units may alternatively be used for the purpose of the invention.

Assume also that each access unit of the second bit stream BS2 starts at the time when a "start_code" starts and end ends at the start of the next "start_code" or the start of one that comes after a given number of "start_codes".

In the case of coding according to MPEG 2 or MPEG 4, each of the obtained access units contains one or more than one stuffing bits so that it has a number of bits that is an integer equal to a multiple of 8.

Figure 4C:
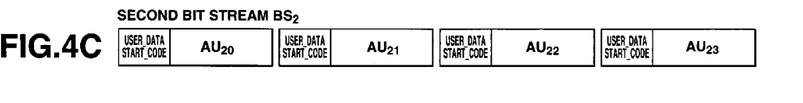

The access units produced by the dividing section 11 are input to the adding section 12. As shown in C of FIG. 4, the adding section 12 adds a start code referred to as "user_data_start_code" to the top of each access unit. Then, the adding section 12 outputs access units with "user_data_start_code" added to each of them.

Note, however, that, if the data structure of the user operable region "user_data" of the first bit stream BS1 for receiving the second bit stream BS2 is subjected to certain restrictions, the divided second bit stream BS2 has to be subjected to a certain data transforming process prior to adding "user_data_start_code" thereto.

The user operable region of MPEG 2, or "user_data", is subjected to restrictions including that the total number of bits is an integer equal to a multiple of 8 and that there should not be consecutive 23 or more than 23 bits having a value of 0 in order to prevent any erroneous detection of "start_code".

Therefore, when putting a bit stream into another bit stream of MPEG 2, it is necessary to make the total number of bits equal to an integer that is an multiple of 8 and process the latter bit stream in order to prevent any erroneous detection of start code "start_code".

More specifically, the second bit stream BS" input to the dividing section 11 as shown in A of FIG. 5 is divided into units of bits whose number of bits is an integer equal to a multiple of 8 as shown in B of FIG. 5. Then, the divided bit stream is subjected to a processing operation conducted by the adding section 12.

Assume here that the divided second bit stream BS2 is coded according to the syntax of MPEG 4 and successfully divided into units of bits whose number is an integer equal to multiple of 8.

Then, each of the units of the divided second bit stream BS2 whose number of bits is an integer equal to a multiple of 8 is then further divided into units of seven bits as shown in C of FIG. 5. If the last unit is short of 7 bits as shown in D of FIG. 5, it is interpolated by adding "0" bit(s) or "1" bit(s).

Figure 5A:
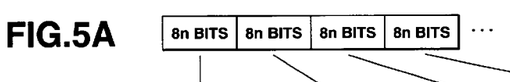
FIG. 5 is a schematic illustration of the processing operation for preventing any erroneous detection of a start code.
Figure 5B:
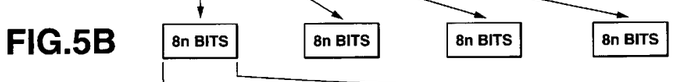
Figures 5C, 5D:
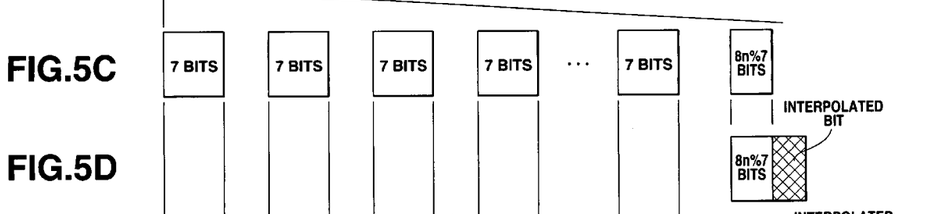
Figure 5E:
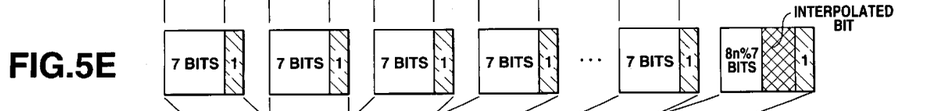
Figure 5F:
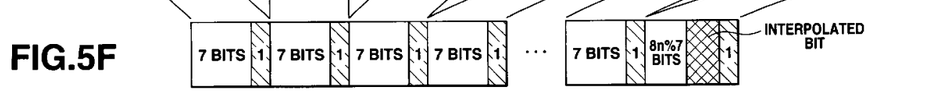

Subsequently, a "1" bit is added to each unit of 7 bits in order to prevent any erroneous detection of start code "start_code" as shown in E of FIG. 5. Finally, as the units are combined, the divided second bit stream BS2 is transformed into data that conform to the syntax of the user data according to MPEG 2.

After the completion of the above process, "user_data_start_code" is added to the top of each transformed access unit.

The signal processing device 10 additionally comprises a multiplexing section 13 for multiplexing the externally input first bit stream BS1 and the bit streams output from the adding section 12 and outputting a multiplexed bit stream BSMUX.

As shown in D of FIG. 4, the multiplexing section 13 carries out the multiplexing operation by inserting an access unit of the second bit stream BS2 having the decoding time and/or the display time as those of the position of "user_data" of the corresponding access unit of the first bit stream BS1 into that "user_data".

Figure 4D:
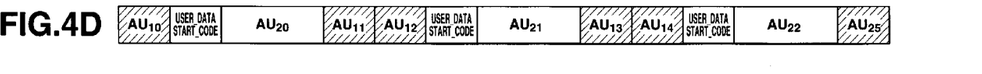

In this way, the multiplexing section 13 multiplexes the first bit stream BS1 and the second bit stream BS2, synchronizing them.

Assume that "user_data" to be used for insertion is located between AU10 and AU11. Then, as a result of multiplexing, AU10, AU20 including "user_data_start code" and AU11 are output in the above mentioned order.

Now, the operation of decoding the multiplexed bit stream BSMUX that is obtained by the signal processing device of FIG. 3 as a result of multiplexing will be discussed below.

Firstly, decoders that can be used for decoding the multiplexed bit stream BSMUX will be described by referring to FIG. 6.

Figure 6A:
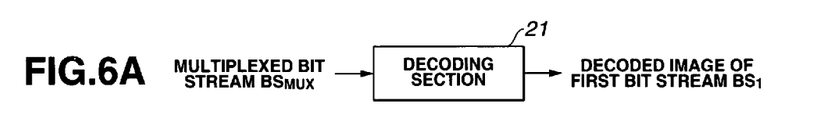
FIG. 6 is a schematic illustration of a method of decoding bit streams.

In FIG. 6, A shows a first decoder for decoding the first bit stream BS1 from the multiplexed bit stream BSMUX. The first decoder comprises only a decoding section 21.

As described earlier, the multiplexed bit stream BSMUX is obtained by inserting the coded data of a second bit stream BS2 into the first bit stream BS1 according to a coding rule.

Therefore, if, for instance, the first bit stream BS1 is formed according to the so-called MPEG 2 syntax, a decoded image of the first bit stream can be obtained by decoding the multiplexed bit stream by means of an MPEG 2 decoder.

When decoding in this way, the data of the second bit stream BS2 that is inserted in the user operable region "user_data" will be ignored.

Figure 6B:
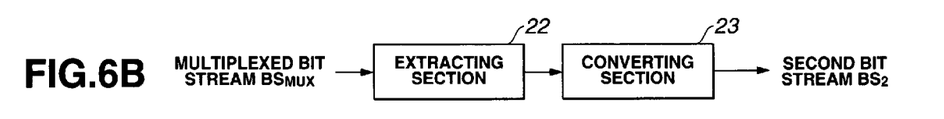

A second decoder as shown in B of FIG. 6 will be used for obtaining the second bit stream BS2 out of the multiplexed bit stream BSMUX.

The second decoder comprises an extracting section 22 for extracting the user data from the multiplexed bit stream BSMUX and a converting section 23 for converting the user data extracted by the extracting section 22 back into the second bit stream BS2.

Since the data of the second bit stream BS2 are stored in the user operable region "user_data" of the multiplexed bit stream BSMUX, firstly the extracting section 22 extracts the "user_data".

Thereafter, the converting section 23 removes "user_data_start_code" and, if "user_data" is processed for preventing any erroneous detection of "start_code", it also undoes the processing or inversely processes the "user_data".

Now, a technique of inversely processing the processing for preventing any erroneous detection of "start_code" will be discussed below.

When the first bit stream BS1 is formed according to the so-called MPEG 2 syntax, the user operable region "user_data" is a string of bits whose number is equal to a multiple of 8 as shown in A of FIG. 7.

Therefore, firstly, the string of bits of the user operable region "user_data" is divided into units of 8 bits as shown in B of FIG. 7. Subsequently, as shown in C of FIG. 7, the one bit added to prevent any erroneous detection of "start_code" is removed. Thereafter, as shown in D of FIG. 7, the remaining bits are put together once again to form a string of bits.

The obtained string of bits contains the stuffing bits added to the end of the string of bits as shown in D of FIG. 7. Therefore, the bit stream down to the bit position that provides the largest value of multiple of 8 as counted from the top of the obtained string of bits is used for the second bit stream BS2.

Figure 7A:
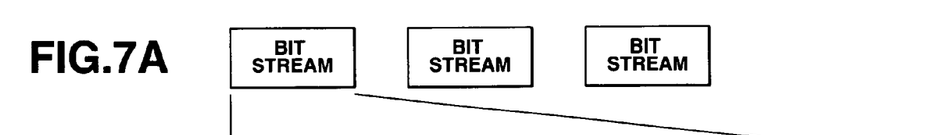
FIG. 7 is a schematic illustration of a process of inversely multiplexing bit streams.
Figure 7B:
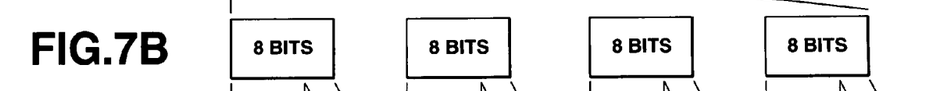
Figure 7C:
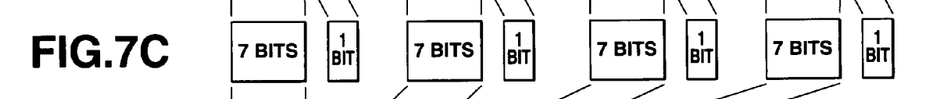
Figure 7D:
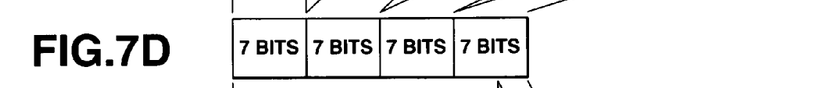
Figure 7E:
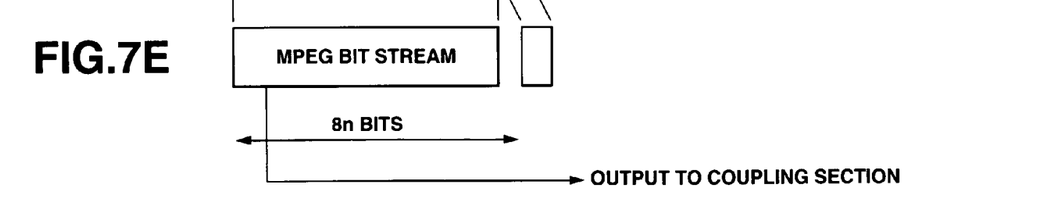

In this example, the second bit stream BS2 conforms to MPEG 4. Any remaining bits of the bit string will be discarded.

Thus, the converting section 23 of the second decoder shown in B of FIG. 6 outputs the second bit stream BS2. In other words, the second decoder restores the second bit stream BS2 out of the multiplexed bit stream BSMUX.

Figure 6C:
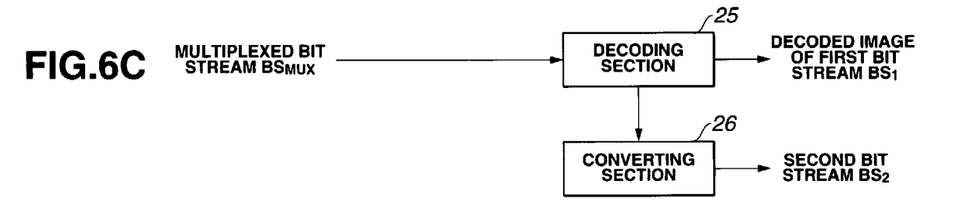

If the decoding section 21 of the first decoder shown in A of FIG. 6 has the functional feature of outputting the user operable region "user_data", the first decoder may be combined with the second decoder shown in B of FIG. 6 to form a third decoder as shown in C of FIG. 6.

Thus, the third decoder is adapted to produce a decoded image of the first bit stream BS1 and, at the same time, restore the second bit stream BS2.

The third decoder comprises a decoding section 25 that is identical with the decoding section 21 of the first decoder and a converting section 26 that is identical with the converting section 23 of the second decoder.

The decoding section 25 of the third decoder is adapted to output a decoded image of the first bit stream BS1 and the user operable region (user_data) contained in the first bit stream BS1.

Then, the user operable region "user_data" is output to the converting section 26, which converts it back into the second bit stream BS2.

In this way, it is possible to multiplex two video bit streams without using MPEG 2. Additionally, it is possible to decode the first bit stream BS1, using a decoder of MPEG 2, without subjecting it to a specific processing operation.

Now, an embodiment of recording medium storing a program for multiplexing bit streams according to the invention will be described. Such a multiplex processing program is typically stored in a CD-ROM.

This embodiment of recording medium according to the invention stores a program for multiplexing a plurality of bit streams. The program is based on a multiplex processing procedure same as the one illustrated in FIG. 3 and described above in terms of a signal recording device according to the invention.

More specifically, the program is adapted to produce a multiplexed bit stream BSMUX by putting a second bit stream BS2 into a user operable region of a first bit stream BS1.

When, putting the second bit stream BS2 into the user operable region of the first bit stream BS1, the program transforms the second bit stream BS2 according to the rule of the first bit stream BS1. As a result, the image data of the first bit stream BS1 can be decoded by using an ordinary decoder without subjecting them to a specific processing operation.

Additionally, the program is adapted to divide the second bit stream BS2 into units of frames or those of a plurality of frames and inserts each of them into the user operable region of a part of the first bit stream BS1 obtained by dividing the latter and having a same display time or a same decoding time.

The program may be used with a coding device and a coding method and stored in a recording medium such as a magneto-optic disk, a magnetic tape or a flash memory and reproduced therefrom so as to be displayed on a display device or transmitted from a transmitter side to a receiver side by way of a transmission path such as a video conference system, a video phone system, an internet system or a television broadcasting facility so that the receiver side may appropriately display the received program.

While the above embodiment is described in terms of multiplexing bit streams, using so-called MPEG 2, the present invention is by no means limited thereto. In other words, the present invention is applicable to various coding systems adapted to provide user-definable data regions.

What is claimed is:

1. A signal processing apparatus for multiplexing first and second bit streams, each of said first and second bit streams being formatted in accordance with a different standard, comprising:
   a dividing means for dividing said second bit stream into access units;
   an adding means for adding a start code in a format corresponding to the standard of said first bit stream to each of said access units obtained by dividing said second bit stream,
   wherein said adding means transforms said divided second bit stream prior to adding said start code if said start code of said first bit stream for receiving said second bit stream is subjected to certain restrictions; and
   a multiplexing means for defining a user operable region in access unit of said first bit stream and multiplexing and recording at least part of said second bit stream on said user operable region.

2. The signal processing device according to claim 1, wherein said start code includes time information and said multiplex means multiplexes and records said first and second bit streams having same time information.

3. The signal processing device according to claim 2, wherein said time information is the display time when the bit streams are displayed or the decoding time when the bit streams are decoded.

4. The signal processing device according to claim 1, wherein said dividing means divides said second bit stream into units of frames or those of a plurality of frames.

5. A set of instructions stored on a processor readable medium executable by a processor, which when executed by said processor, performs a signal processing method for multiplexing first and second bit streams, each of said first and second bit streams being formatted in accordance with a different standard, comprising:
   a dividing step for dividing said second bit stream into access units;
   an adding step for adding a start code in a format corresponding to the standard of said first bit stream to each of said access units obtained by dividing said second bit streams
   wherein said adding step transforms said divided second bit stream prior to adding said start code if said start code of said first bit stream for receiving said second bit stream is subjected to certain restrictions; and
   a multiplexing step for defining a user operable region in access unit of said first bit stream and multiplexing and recording at least part of said second bit stream on said user operable region.

6. The signal processing method according to claim 5, wherein said start code includes time information and said multiplex step multiplexes and records said first and second bit streams having same time information.

7. The signal processing method according to claim 6, wherein said time information is the display time when the bit streams are displayed or the decoding time when the bit streams are decoded.

8. The signal processing method according to claim 5, wherein said dividing step divides said second bit stream into units of frames or those of a plurality of frames.

9. A recording medium storing a program for multiplex first and second bit streams, each of said first and second bit streams being formatted in accordance with a different standard, said program comprising:
   a dividing step for dividing said second bit stream into access units;
   an adding step for adding a start code in a format corresponding to the standard of said first bit stream to each of said access units obtained by dividing said second bit stream,
   wherein said adding step transforms said divided second bit stream prior to adding said start code if said start code of said first bit stream for receiving said second bit stream is subjected to certain restrictions; and
   a multiplexing step for defining a user operable region in access unit of said first bit stream and multiplexing and recording at least part of said second bit stream on said user operable region.

10. The recording medium according to claim 9, wherein said dividing step divides said second bit stream into units of frames or those of a plurality of frames.

11. A decoding device adapted to decode a multiplexed bit stream conforming to a first standard format obtained by defining a user operable region in access unit of a first bit stream and multiplexing and recording at least part of a second bit stream conforming to a second standard format different from said first standard format, said second bit stream also conforming to a syntax of said first standard format, on said user operable region, said decoding device comprising:
   a means for detecting the user operable region in said multiplexed bit stream and extracting the data contained in said user operable region;

a converting means for conducting a predetermined converting operation on said data contained in said user operable region and restoring the second bit stream, which was divided into access units, added a start code of said first bit stream to each of said access units, and transformed said divided second bit stream prior to adding said start code if said start code was subjected to certain restrictions; and a decoding means for decoding said first bit stream contained in said multiplex bit stream except said user operable region and said second bit stream.

12. A decoding method adapted to decode a multiplexed bit stream conforming to a first standard format obtained by defining a user operable region in access unit of a first bit stream and multiplexing and recording at least part of a second bit stream conforming to a second standard format different from said first standard format, said second bit stream also conforming to a syntax of said first standard format, on said user operable region, said decoding method comprising:

a step for detecting the user operable region in said multiplexed bit stream and extracting the data contained in said user operable region;

a step for conducting a predetermined converting operation on said data contained in said user operable region and restoring the second bit stream, which was divided into access units, added a start code of said first bit stream to each of said access units, and transformed said divided second bit stream prior to adding said start code if said start code was subjected to certain restrictions; and a step for decoding said first bit stream contained in said multiplex bit stream except said user operable region and said second bit stream.

13. A computer readable recording medium storing a program comprising a set of instructions, executable by a computer, which when executed by said computer causes the computer to perform said program for decoding a multiplexed bit stream conforming to a first standard format obtained by defining a user operable region in access unit of a first bit stream and multiplexing and recording at least part of a second bit stream conforming to a second standard format different from said first standard format, said second bit stream also conforming to a syntax of said first standard format, on said user operable region, said program comprising:

a step for detecting the user operable region in said multiplexed bit stream and extracting the data contained in said user operable region;

a step for conducting a predetermined converting operation on said data contained in said user operable region and restoring the second bit stream, which was divided into access units, added a start code of said first bit stream to each of said access units, and transformed said divided second bit stream prior to adding said start code if said start code was subjected to certain restrictions; and a step for decoding said first bit stream contained in said multiplex bit stream except said user operable region and said second bit stream.

14. The signal processing apparatus of claim 1, wherein said units of said second bit stream conform to a syntax of said standard of said first bit stream.

15. The signal processing apparatus of claim 14, wherein said units of said second bit stream cannot be processed by a processor for processing said first bit stream.

16. The signal processing apparatus of claim 15, wherein said standard of said first bit stream is MPEG 2.

17. The signal processing apparatus of claim 16, wherein said units of said second bit stream are formatted to contain an integer number of bits that is a multiple of eight.

18. The signal processing apparatus of claim 16, wherein said units of said second bit stream are formatted to contain 23 or less consecutive bits having a value of zero.

19. The signal processing method of claim 5, wherein said units of said second bit stream conform to a syntax of said standard of said first bit stream.

20. The signal processing method of claim 19, wherein said units of said second bit stream cannot be processed by a processor for processing said first bit stream.

21. The signal processing method of claim 20, wherein said standard of said first bit stream is MPEG 2.

22. The signal processing method of claim 21, wherein said units of said second bit stream are formatted to contain an integer number of bits that is a multiple of eight.

23. The signal processing method of claim 21, wherein said units of said second bit stream are formatted to contain 23 or less consecutive bits having a value of zero.

24. The recording medium of claim 9, wherein said units of said second bit stream conform to a syntax of said standard of said first bit stream.

25. The recording medium of claim 24, wherein said units of said second bit stream cannot be processed by a processor for processing said first bit stream.

26. The recording medium of claim 25, wherein said standard of said first bit stream is MPEG 2.

27. The recording medium of claim 26, wherein said units of said second bit stream are formatted to contain an integer number of bits that is a multiple of eight.

28. The recording medium of claim 26, wherein said units of said second bit stream are formatted to contain 23 or less consecutive bits having a value of zero.

* * * * *